R. A. FESSENDEN.
METHOD AND APPARATUS FOR AGRICULTURAL ENGINEERING.
APPLICATION FILED FEB. 4, 1918.
1,268,949.
Patented June 11, 1918.
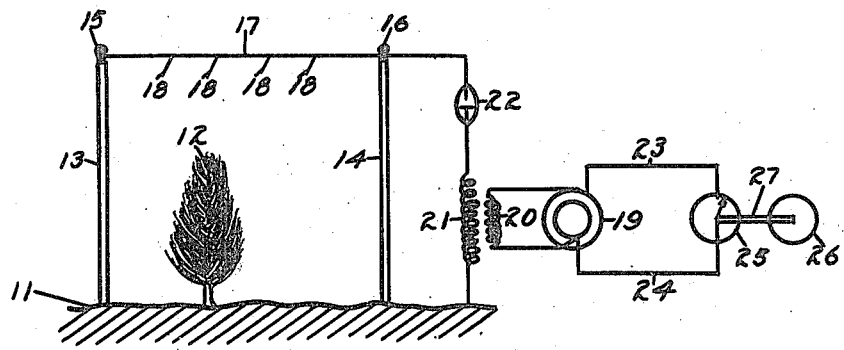
WITNESS:
INVENTOR.

UNITED STATES PATENT OFFICE.

REGINALD A. FESSENDEN, OF BROOKLINE, MASSACHUSETTS.

METHOD AND APPARATUS FOR AGRICULTURAL ENGINEERING.

1,268,949. Specification of Letters Patent. Patented June 11, 1918.

Application filed February 4, 1918. Serial No. 215,358.

*To all whom it may concern:*

Be it known that I, RIGINALD A. FESSENDEN, of Brookline, in the county of Norfolk and State of Massachusetts, a citizen of the United States, have invented new and useful Improvements in Methods and Apparatus for Agricultural Engineering, of which the following is the specification.

My invention relates to agricultural engineering and more particularly to the growth of plants, and has for its object increased efficiency in agricultural engineering and more particularly increased production and better quality of agricultural products.

The figure accompanying this specification shows partly diagrammatically suitable means for carrying out my invention.

That the growth of plants may be influenced by the discharge of electricity has been well known for more than a hundred years. It has, however, been found very difficult to obtain consistent results and while in some experiments the electrical discharges have apparently greatly increased the rate of growth, in other experiments the effect has been negligible or even negative.

Applicant, in continuation and extension of this experimental work in agricultural engineering, a portion of which has already been disclosed and claimed in U. S. Patent 1,121,722, filed October 6, 1906, has discovered new methods and apparatus for influencing the growth of plants by electrical discharges, which appear to give consistent and very favorable results, as follows:

In the figure, 11 is the soil, 12 is the plant whose rate of growth and production is to be increased, 13—14 are posts, 15, 16 are insulators, 17 is an electrical conductor, 18, 18, 18, 18 are discharge points, 22 is a high potential rectifier of any suitable form well known in the art—preferably a hot cathode type—21 is the high potential secondary of a transformer, connected to the ground as shown.

20 is the primary of the transformer; 19 is an alternating current dynamo for exciting the transformer; 23, 24 are the field leads of the dynamo connected to the rheostat 25, having the axis 27 of its contact arm driven by the motor 26, so that on the motor 26 turning around, the axis 27 of the contact arm of the rheostat 25 also rotates and the resistance of the field circuit 23, 24 of the dynamo 19 is periodically increased and diminished during each revolution, and consequently the potential of the dynamo 19 is also periodically increased and decreased and so consequently the electric discharge from the discharge points 18, 18, 18, 18 is likewise periodically increased and decreased each time the motor 26 makes a full revolution.

By this means, in place of maintaining a steady discharge or an indefinite and irregular discharge or a high frequency discharge from the discharge points 18, 18, 18, 18, a definitely periodic discharge and of relatively low frequency is obtained, and this method of operation appears to give consistant and favorable results.

Applicant does not know definitely why this method should give so much better results than the methods heretofore used. The facts as observed by him are that when the electric discharge is continuous or of high frequency or irregularly intermittent, the results obtained vary considerably; but that when the electric discharge apparatus is arranged as shown to give a definitely periodic discharge, depending upon the speed of rotation of the motor 26, on starting in with a high rate of discharge frequency and decreasing the frequency every few days, a critical frequency will be reached which gives a very rapid increase of growth, while frequencies higher than this frequency give very much poorer and more or less inconsistent results, and frequencies lower than this critical frequency are not quite so good and if much lower give much poorer results.

The rate of frequency which applicant has found to be best is, as a rule, much lower than would have been anticipated, *i. e.*, as low as once in five seconds, or even lower.

Applicant has found that with most plants there are two or three critical frequencies; for example, one revolution in four seconds, one in two and a half seconds, and one in one-half second, but the relation of these critical frequencies to each other has not so far been determined.

Applicant has also found that the critical frequency, or frequencies, depend upon the kind of plant and upon its age and possibly upon the distance apart of the branches of the plant.

Applicant has also found that it is sometimes advantageous to arrange the steps of the rheostat 25 so that the variation of the potential at the discharging points 18, 18, 18, 18 does not vary as a smooth sine curve but is, on the contrary, strongly peaked.

Applicant has also found that it is sometimes advantageous to have prolonged periods of rest; i, e., to operate the apparatus for a number of hours and then to entirely discontinue the electrical discharges for a time.

What applicant claims is:

1. The method of increasing the growth and production of plants, which consists in generating an electrical discharge, controlling said electrical discharge so that said discharge occurs at a definite, pre-determined, and relatively low frequency, and placing said electrical discharge in operative relation to the plant whose growth is to be influenced, thereby promoting the growth of said plants.

2. Apparatus for increasing the production and growth of plants, comprising an electrical discharge field in proximity to said plants and means for varying the intensity of said electrical discharge periodically and at a relatively low frequency.

REGINALD A. FESSENDEN.